# United States Patent [19]

Villa

[11] 3,975,316

[45] Aug. 17, 1976

[54] CURING LIQUID POLYURETHANE PREPOLYMERS

[75] Inventor: Jose L. Villa, Highstown, N.J.

[73] Assignee: Thiokol Corporation, Newtown, Pa.

[22] Filed: Nov. 29, 1973

[21] Appl. No.: 419,990

Related U.S. Application Data

[63] Continuation-in-part of Ser. No. 250,319, May 4, 1972, abandoned.

[52] U.S. Cl. .................. 260/2.5 AK; 260/2.5 AL; 260/2.5 AT; 260/2.5 BE; 260/28 R; 260/33.6 UB; 260/37 N; 260/859 R

[51] Int. Cl.² .......................................... C08J 9/02

[58] Field of Search ...... 260/2.5 AK, 37 N, 2.5 AD, 260/2.5 AP, 2.5 BE, 33.6 UB, 28, 859 R, 2.5 AT

[56] References Cited

UNITED STATES PATENTS

| | | | |
|---|---|---|---|
| 2,726,219 | 12/1955 | Hill | 260/2.5 AP |
| 3,004,921 | 10/1961 | Stossel | 260/2.5 AK |
| 3,150,109 | 9/1964 | Ferrigno | 260/2.5 AK |
| 3,395,108 | 7/1968 | Cobbledick | 260/37 N |
| 3,419,533 | 12/1968 | Dieterich | 260/77.5 |
| 3,441,523 | 4/1969 | Dwyer et al. | 260/2.5 AK |
| 3,505,275 | 4/1970 | Sato et al. | 260/37 N |
| 3,607,794 | 9/1971 | Abbotson | 260/2.5 AK |
| 3,634,342 | 1/1972 | Boblitt | 260/2.5 AK |
| 3,655,600 | 4/1972 | Stevens | 260/2.5 AK |
| 3,694,301 | 9/1972 | Gruenewald | 161/151 |
| 3,781,231 | 12/1973 | Janssen | 260/2.5 BE |
| 3,793,241 | 2/1974 | Kyle | 260/2.5 AM |

FOREIGN PATENTS OR APPLICATIONS

| | | | |
|---|---|---|---|
| 250,042 | 7/1960 | Australia | 260/2.5 AK |
| 611,536 | 12/1960 | Canada | 260/2.5 AK |

OTHER PUBLICATIONS

"Polyurethanes Chemistry and Technology, Part II Technology," Saunders et al., Interscience; N.Y., 1964; pp. 7–10, 201–202, 300–306.

*Primary Examiner*—C. Warren Ivy
*Attorney, Agent, or Firm*—Stanley A. Marcus

[57] ABSTRACT

Liquid isocyanate-terminated polyurethane prepolymers are cured by mixing them with about 5% to 200% by weight, preferably 10% to 100% by weight, based on the weight of prepolymer, of an aqueous colloidal dispersion selected from aqueous alkali metal silicates containing from about 20% to 60% solids and aqueous magnesium oxide containing from about 5% to 40% solids. The water associated with the aqueous dispersion is bound in the cured product and thus the dispersions act as both curing agents and low cost extenders. The cured materials may be non-porous elastomeric products or finely cellular products. Some of the cellular products are rigid and suitable for, e.g., structural applications. Both types of products have good flame retardant properties.

25 Claims, No Drawings

CURING LIQUID POLYURETHANE PREPOLYMERS

This application is a continuation-in-part of pending application Ser. No. 250,319 filed May 4, 1972, now abandoned.

This invention relates to a novel and economical method of curing liquid polyurethane prepolymers and to the cured products thus produced. More particularly, the invention relates to the novel use of a group of materials which have been found to be both effective curing agents and low cost extenders for polyurethane prepolymers. The products may be non-porous and elastomeric or cellular and either flexible or rigid. The rigid cellular products prepared from polyfunctional urethane prepolymers have a number of wood-like physical properties.

Most of the commercially useful polyurethanes fall broadly into two categories, namely, solid, non-porous elastomers used, for example, in coatings, adhesive compositions, castings and thread-making, and cellular products used, for example, in cushions, shock-resistant packaging, air filters and thermal insulating applications. Both types of polyurethane polymers are commonly made by first forming an isocyanate-terminated liquid prepolymer which is subsequently cured through the isocyanate groups of the prepolymer to elastomeric or rigid form with curing agents such as, for example, polyhydric alcohols or aliphatic or aromatic amines. As is known in the art, the isocyanate-terminated prepolymers may have a wide variety of backbone structures such as polyester, polyether, polysulfide, polybutadiene, butadiene-styrene copolymer and butadiene-acrylonitrile copolymer chains.

In general, the materials used for making polyurethane polymers are relatively expensive and thus in many cases it is economically advantageous to incorporate in the polymers, usually in the liquid prepolymers, a low cost extender to reduce the cost of the end products. While a large number of inexpensive materials are potentially available as low cost extenders, many of these materials adversely affect the properties of the end products produced or can be used to produce only a limited number of end products with acceptable properties, or exhibit instability over a period of time or under the conditions of end product use.

Similarly the curing agents used for curing the liquid polyurethane prepolymers are relatively expensive materials and hence there is a need for lower cost curing agents that will cure such prepolymers to end products having acceptable properties.

The present invention is based on the discovery of a group of low cost materials which, when incorporated in liquid polyurethane prepolymers in the manner described below, perform the dual function of curing the prepolymer and acting as a low cost extender, as well as providing certain other advantages as will be described hereafter.

It is an object of the present invention to provide a novel and improved curing system for a polyurethane prepolymer. It is another object of the invention to provide such a curing system characterized by the fact that it consists of or includes a material which both effectively cures the prepolymer and acts as a low cost extender. It is still another object of the invention to provide a method of curing liquid polyurethane prepolymers with a material that functions both as an effective curing agent and a low cost extender, as well as to provide relatively low cost products produced by the method. It is still another object of the invention to provide relatively low cost elastomeric and foamed polyurethane polymers having good physical properties. It is a still further object of the invention to provide novel low cost, rigid, finely cellular, light-weight polyurethane polymers adapted to be used for structural purposes and a method of making such products. It is still another object of the invention to provide flame-proof polyurethane products. Other objects of the invention will be in part obvious and in part pointed out hereafter.

The objects and advantages of the present invention can be achieved in general by mixing isocyanate-terminated liquid polyurethane prepolymers with aqueous colloidal dispersions or gels of certain inorganic oxides and oxide mixtures, in particular, aqueous magnesium oxide and aqueous alkali metal silicates, e.g., sodium, potassium and lithium silicates, as well as aqueous dispersions of finely divided silica. It has been found surprisingly that when the present dispersions are mixed with urethane prepolymers the rather substantial water content of the dispersions is nearly all bound in some manner such that it becomes an integral part of the cured composition. The mixtures cure fully at room temperature with little, if any, shrinkage, thus demonstrating that nearly all the water associated with the dispersion remains bound in the cured composition and does not evaporate therefrom.

Because of their low cost and ready availability, the aqueous sodium silicates are preferred. While the extenders are referred to herein as aqueous colloidal dispersions, it has been found that the liquid phase of the dispersion may contain, in addition to water, other liquids miscible with water such as, e.g., ethylene glycol, polyglycols and polyglycol ethers, and the phrase "aqueous dispersion" as used herein is intended to include such mixtures.

It has been found that the proportion of magnesium oxide in the dispersions made therefrom is desirably somewhat less than the proportion of silicates in the silicate dispersions. More particularly, the magnesium oxide dispersions preferably contain from about 5% to 40% of magnesium oxide. The magnesium oxide used has a sufficiently fine particle size so that even when it is present in relatively small proportions, the dispersion has a pasty consistency.

In the case of the silicate and silica dispersions, the solids content may be from 5% to 60% by weight of the colloidal dispersion and is preferably from about 20% to 60% by weight of the dispersion. Silicates having various ratios of alkali metal oxide to silica ($M_2O:SiO_2$) may be used. Thus the ratio $M_2O:SiO_2$ may vary from 0:1 to 1:1 with the initial ratio indicating silica per se. The preferred ratio is from about 1:1 to 1:4.

The amount of the aqueous dispersion reacted with the liquid polyurethane prepolymer may vary over a relatively wide range of say about 5% to 200% by weight, based on the weight of prepolymer. The preferred range is about 10% to 100% of the aqueous dispersion based on the weight of prepolymer.

In general, any of the known isocyanate-terminated liquid polyurethane prepolymers may be advantageously cured and extended with the present aqueous dispersions. As is known in the art, such prepolymers may be made by reacting organic polyisocyanates in molar excess with liquid hydroxyl-containing or carboxyl-containing polyesters, polyethers, polysulfides, polybutadienes and other polyols.

The liquid polyesters used in preparing urethane prepolymers are commonly made by condensing dihydric alcohols and dibasic acids. As dihydric alcohols there may be used, for example, glycols such as ethylene, propylene, butylene, tetramethylene, or hexamethylene glycols, as well as polyglycols and glycol mixtures. Suitable dibasic acids for condensation with the glycols include, for example, adipic, glutaric, pimelic, suberic, azelaic and sebacic acids and mixtures of such acids. Other ester glycols are prepared from castor oil. Because of the widespread use of such liquid polyesters, their properties and methods for making them are extensively discussed in the literature, and hence no extended discussion herein is deemed necessary.

The polyether polyols useful in making polyurethane prepolymers are also well known in the art. Polyalkylene glycols such as polymethylene, polyethylene, polypropylene and polybutylene glycols and mixtures thereof are commonly used. Any of the polyether polyols known to be useful in preparing liquid urethane prepolymers can be used in making the present products.

Another type of polyol and urethane prepolymer useful for the present purposes is disclosed in U.S. Pat. No. 3,386,963 to Santaniello, incorporated herein by reference. Briefly, this polyurethane prepolymer is a hydroxy-group-containing polysulfide polymer which is reacted with a polyisocyanate in proportions such that the ratio of isocyanate groups to hydroxyl groups is between 1 and 4.

Still another suitable group of polyols are the liquid hydroxyl-terminated polybutadiene homo- and copolymers having molecular weights within the range 400 to 5000 and available from Arco Chemical Co. The homopolymers are identified by the trade designations poly B-D R-15M and poly B-D R45M and have viscosities of 200 poises and 50 poises, respectively. Copolymers which are liquid and are based on the hydroxy-terminated polybutadiene resins and also available from the same source are the poly B-D CS-15 butadiene-styrene copolymers having about 75% weight percent butadiene units and 25% weight percent styrene units and having a viscosity of about 25 poises, the hydroxy-terminated butadiene-acrylonitrile copolymers (CN-15) having about 85% by weight of butadiene units and 15% by weight of acrylonitrile units in the polymer and having a viscosity of about 500 poises.

A wide variety of polyisocyanates can suitably be reacted with the above-described hydroxyl-containing polymers to prepare the isocyanate-terminated polysulfide polymers of the invention. Generally, any of the organic polyisocyanates that have previously been proposed for the preparation of polyurethane resins may be employed in preparing the present products. Suitable polyisocyanates are, for example, arylene polyisocyanates such as tolylene, metaphenylene, 4-chlorophenylene-1,3-, methylene-bis-(phenylene-4-), biphenylene-4,4'-, 3,3'-dimethoxy-biphenylene-4,4', 3,3'-diphenylbiphenylene-4,4'-, naphthalene-1,5- and tetrahydronaphthalene-1,5-diisocyanates and triphenylmethane triisocyanate; alkylene polyisocyanates such as ethylene, ethylidene, propylene-1,2-, butylene-1,4-, butylene-1,3-, hexylene-1,6-, decamethylene-1,10, cyclohexylene-1,2-, cyclohexylene-1,4-, and methylene-bis-(cyclohexyl-4,4'-) diisocyanates. Tolu-ene diisocyanates, commercially the most widely used diisocyanates, are preferred especially a mixture of 80% of the 2,4-isomer and 20% of the 2,6-isomer thereof. Inorganic polyisocyanates are also suitable according to the invention.

As indicated to the specific Examples given below, high ratios of prepolymer to aqueous dispersion tend to favor the production of cellular products, whereas low ratios of prepolymer to aqueous dispersions tend to produce non-porous products. When difunctional prepolymers, i.e., those having only two terminal isocyanate groups, are used, the products tend to be elastomeric, whereas when prepolymers having a higher functionality, e.g., three to six isocyanate groups per molecule, are used, the products tend to be rigid. More particularly, it has been found that by using blends of trifunctional and tetrafunctional prepolymers, rigid, finely cellular, light-weight plastic products are obtained having very interesting properties. Thus these products can be sawed like wood, have good nail-holding properties, and more generally, have properties that render them useful for structural applications. The blends desirably contain from 25% to 75% by weight of trifunctional prepolymer and from 75% to 25% by weight of tetrafunctional prepolymer.

It has been further found that both the non-porous elastomers and the cellular products have good flame-retardant properties. Also, as shown in the Examples set forth below, the present products have good electrical and low temperature properties.

It will, of course, be understood that for certain applications the prepolymers cured with the present curing agent extenders may, either prior to curing or at the time of cure, be formulated with conventional special purpose additives such as plasticizers, fillers, curing rate modifiers, pigments and the like. For example, from 5% to 50% by weight, based on the weight of prepolymer, of a high-boiling aromatic ester plasticizer, such as a benzoate or phthalate ester, or polyester benzoate, e.g., dipropylene glycol benzoate, dodecyl phthalate or propylene glycol phthalate, can be used. Also it has been found that, especially when the prepolymer backbone is a polybutadine, the compositions may be further extended with say 10% to 50%, based on the weight of isocyanate, of other low cost extenders such as coal tar, e.g., Allied Chemical 439 oil, a high boiling coal tar distillate having a Brookfield viscosity at 160°F. of 14–33 c.p., mineral oil and poly-alpha-methyl styrene, e.g., Dow Resin 276-V2 which is typically a water white liquid having a viscosity at 60°C. of 100–200 c.p. Moreover, the urethane prepolymer, prior to or at the time of cure, may be blended with other types of polymers, e.g., mercapto-terminated liquid polysulfide polymers such as the liquid polysulfide polymer sold under the trademark LP-2 and having the average structural formula:

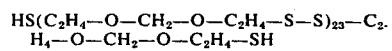

In order to point out more fully the nature of the present invention, the following specific Examples are given of illustrative embodiments of the invention.

EXAMPLE 1

A series of elastomeric polyurethane sheets were prepared as follows:

A mixture of 80% by weight ethylene glycol and 20% by weight propylene glycol was mixed with an approximately equimolar amount of adipic acid, and the glycols and acids were condensed to form a polyester having a molecular weight of about 2000. The polyester was reacted with tolylene diisocyanate to form a urethane prepolymer having an NCO content of about 3.5%. This prepolymer was used in preparing the following six formulations:

| | | |
|---|---|---|
| (a) | Liquid polyurethane prepolymer | 114 grams |
| | Aqueous sodium silicate (Silicate "N", Phila. Quartz Co.) | |
| | SiO$_2$:Na$_2$O ratio 3.22:1, 37.6% silicate | 6 grams |
| (b) | Liquid polyurethane prepolymer | 102 grams |
| | Aqueous sodium silicate (Silicate "C", Phila. Quartz Co.) | |
| | SiO$_2$:Na$_2$O ratio 2:1, 54% silicate | 18 grams |
| (c) | Liquid urethane prepolymer | 102 grams |
| | Aqueous magnesium oxide (28% by weight MgO suspension in water) | 18 grams |
| (d) | Liquid urethane prepolymer | 102 grams |
| | Aqueous magnesium oxide suspension (37% MgO by weight) | 18 grams |
| (e) | Liquid polyurethane prepolymer | 102 grams |
| | Aqueous potassium silicate (Kasil 6, Phila. Quartz Co.) | |
| | SiO$_2$:K$_2$O ratio 2.1:1, 38% silicate | 18 grams |
| (f) | Liquid polyurethane prepolymer | 102 grams |
| | Aqueous potassium silicate (Kasil 1) | |
| | SiO$_2$:K$_2$O ratio 2.5:1, 29% silicate | 18 grams |

In each of the foregoing formulations the components were thoroughly mixed, then poured into a mold at room temperature. When the mixture reached its gel point, the mold was clamped shut and the composition allowed to cure for 16 hours at room temperature. In each case notwithstanding the substantial amount of water incorporated in the mixture with the aqueous dispersion the mixture cured to an elastomer without foaming. Thus substantially all the water associated with the aqueous dispersion was bound within the composition.

After curing the samples were removed from the mold and postcured for 1 hour at 158°F. Thereafter the sheets were tested to determine solvent swell in toluene and ethyl acetate and various physical properties as indicated in Tables I and II below.

Table I

| Solvent Swell - Percent by Volume Increase | | | | | | |
|---|---|---|---|---|---|---|
| | (a) | (b) | (c) | (d) | (e) | (f) |
| Toluene (4 hours) | 76 | 66 | 67 | 61 | 75 | 70 |
| Toluene (24 hours) | 106 | 93 | 86 | 78 | 99 | 92 |
| Ethyl acetate (4 hours) | 200 | 162 | 142 | 128 | 170 | 186 |
| Ethyl acetate (24 hours) | 272 | 205 | 161 | 150 | 203 | 260 |

Table II

| Physical Properties | | | | | | |
|---|---|---|---|---|---|---|
| | (a) | (b) | (c) | (d) | (e) | (f) |
| Shore "A" hardness | 64 | 64 | 67 | 70 | 63 | 60 |
| Tear (pli) | 193 | 133 | 260 | 275 | 188 | 143 |
| Tensile (psi) | 3155 | 1740 | 4160 | 4407 | 3630 | 2080 |
| Elongation | 640 | 625 | 755 | 700 | 825 | 800 |
| 100% Modulus | 220 | 110 | 200 | 290 | 190 | 50 |
| 300% Modulus | 550 | 350 | 500 | 900 | 320 | 250 |

The foregoing data show that formulations (a) through (f) yielded elastomers having good properties even though they contained a substantial amount of bound water. Also the compositions have good flame retardant properties.

EXAMPLE 2

A polyurethane prepolymer was prepared by reacting polypropylene glycol having an average molecular weight of about 500 with toluene diisocyanate in an NCO/OH molar ratio of about 2:1. 22.5 parts by weight of this liquid prepolymer were thoroughly mixed with 7.5 parts by weight of aqueous sodium silicate (Silicate N). The mixture cured at room temperature to give an unusually tough rubber showing little shrinkage and good adhesion to concrete after 7 days curing in air. Its adhesion to concrete after immersion in water for 7 days was unusually high. More particularly, this formulation when cured on concrete exhibited cohesive failure after both air curing and after 7 days immersion in water.

EXAMPLE 3

A formulation was prepared by mixing 25.5 grams of the liquid polymer of Example 1 and 4.5 grams of aqueous sodium metasilicate (43% sodium silicate/57% water). The mixture cured to a white tough rubber similar to that obtained with formulations (a) and (b) of Example 1.

EXAMPLE 4

A liquid polyurethane prepolymer was prepared by reacting polypropylene glycol with tolylene diisocyanate to form a polyether having an NCO content of about 4%. A composition was prepared using this prepolymer and having the following formulation in parts by weight:

| Component | Parts by Weight |
|---|---|
| Liquid polyurethane prepolymer | 10 |
| Poly-alpha-methyl styrene (Dow resin 276-V2) | 10 |
| Aqueous sodium silicate (Silicate "N") | 10 |

The liquid prepolymer and poly-alpha-methyl styrene were premixed before adding the aqueous silicate. The composition cured without foaming at room temperature to give a good rubber in which the water of the aqueous silicate was bound.

EXAMPLE 5

A sealant composition was prepared having the following formulation:

Part A

| Component | Parts by Weight |
|---|---|
| Coal Tar (Allied Chemical 439) | 10 |
| Aqueous Sodium Silicate (Silicate "N") | 10 |
| Liquid polysulfide polymer (LP-2) | 10 |

Part B

Liquid polyurethane prepolymer
 (condensation product of polypropy-

Part A-continued

| Component | Parts by Weight |
|---|---|
| lene glycol and tolylene diisocyanate having about 4% free NCO) | 10 |
| Lead dioxide curing paste (50:50 mixture of lead dioxide and chlorinated biphenyl) | 1.5 |

The ingredients of Part A and Part B were separately mixed and the two mixtures then combined. A hard cured rubber was obtained within a few seconds.

EXAMPLE 6

A sealant composition was prepared having the following formulation:

| Component | Parts by Weight |
|---|---|
| Liquid polyurethane polymer (as in Example 2) | 10 |
| Poly-alpha-methyl styrene (Dow resin 276-V2) | 10 |
| Aqueous sodium silicate (Silicate "N") | 10 |
| Liquid polysulfide polymer (LP-2) | 3 |

The urethane prepolymer, poly-alpha-methyl styrene and aqueous silicate were premixed and the liquid polysulfide polymer then mixed therewith. A relatively fast cure was obtained to yield a white rubber having good physical properties.

EXAMPLE 7

A sealant composition was prepared having the following formulation:

| Component | Parts by Weight |
|---|---|
| Liquid polyurethane prepolymer (as in Example 2) | 10 |
| Poly-alpha-methyl styrene (Dow resin 276-V2) | 10 |
| Aqueous sodium silicate (Silicate "N") | 10 |
| Liquid polysulfide polymer (LP-2) | 1 |

The aqueous silicate and polystyrene resin were thoroughly mixed and then mixed with the urethane prepolymer and liquid polysulfide polymer. The resulting mixture cured rapidly to yield a soft but good rubber cure.

EXAMPLE 8

A sealant composition was prepared having the following formulation:

| Component | Parts by Weight |
|---|---|
| Liquid polyurethane prepolymer (as in Example 2) | 10 |
| Poly-alpha-methyl styrene (Dow resin 276-V2) | 10 |
| Aqueous sodium silicate (Silicate "N") | 10 |

Upon mixing the foregoing ingredients in the indicated proportions the mixture cured to give a good rubber.

EXAMPLE 9

A quantity of liquid hydroxyl-terminated polybutadiene having 20% pendant vinyl groups (Poly B-D R45M, Arco Chemical Co.) was placed in a resin pot and dried under a reduced pressure of 20 m.m.a. for 2 hours at 80°C. The vacuum was broken with nitrogen to provide a nitrogen atmosphere and 2,4-tolylene diisocyanate (Hylene TM) was added in an amount sufficient to produce a urethane prepolymer having a free NCO content of about 4%. A mild exotherm developed, after which the reaction mixture was heated at 60°C. for 5 hours. Then one part by weight per hundred parts of the prepolymer of an anti-oxidant (1,3,5-trimethyl, 3,5-di-tert.butyl-4-hydroxybenzyl benzene) was added and heating continued for a short time, after which the prepolymer was cooled.

Several formulations incorporating this prepolymer were prepared and cured by introducing the formulation into a mold and permitting it to stand until a gel point was reached. The mold was then closed and after 16 hours was placed in an oven at 158°F. for 5 hours. The resulting specimens were tested for physical properties with the results given in Table III below.

a. 75 parts by weight of urethane prepolymer and 25 parts by weight of aqueous sodium silicate (Silicate N).

b. Equal parts of urethane prepolymer and poly-alpha-methyl styrene with 25% by weight of silicate N based on the weight of prepolymer.

c. Same as sample (b) but with 16.5% carbon black, based on total weight of mixture, added.

d. Equal parts of urethane prepolymer and liquid polysulfide polymer (LP-32) with 25% by weight of silicate N based on weight of prepolymer.

e. (Control) Urethane prepolymer cured with 2-ethyl-1,3-hexane diol.

f. (Control) Urethane prepolymer cured with N,N'-bis-(1,4-dimethylpentyl)p-phenylene diamine.

Table III

| Ex. Example No. | "G" 10,000 | % Recovery | Shore A Hardness | Tear Pi | Tensile psi | Elong. | 100% Elong. | 300% Elong. |
|---|---|---|---|---|---|---|---|---|
| (a) | −105°F. | 90 | 57 | 115 | 820 | 385 | 328 | 634 |
| (b) | −58°F. | 83 | 51 | 77 | 325 | 245 | 180 | — |
| (c) | −54°F. | 82 | 60 | 112 | 1000 | 333 | 330 | 915 |
| (d) | −94.5°F. | 81 | 54 | 62 | 755 | 235 | 475 | — |
| (e) | −98°F. | 29 | 57 | 82 | 387 | 390 | 150 | 280 |
| (f) | −92°F. | none | 67 | 117 | 763 | 433 | 245 | 430 |
| After 1 Week at 100°C. | | | | | | | | |
| (a) | −105°F. | — | 68 | 100 | 776 | 265 | 358 | — |
| (b) | −58°F. | — | 45 | 55 | 360 | 310 | 147 | — |
| (c) | −53°F. | — | 63 | 57 | 800 | 180 | 245 | — |
| (d) | −95°F. | — | 67 | 101 | 518 | 170 | 364 | — |
| (e) | −97°F. | — | 57 | 57 | 310 | 335 | 150 | 282 |
| (f) | −92°F. | — | 39 | 43 | 294 | 800 | 40 | 86 |

EXAMPLE 10

Formulations were prepared and cured like samples (a), (b), (d), (e) and (f) of the preceding Example and certain of their electrical properties determined with the results given in Table IV below.

Table IV

| Sample No. | Dielectric Constant at 1 KC | Dissipation Constant at 1 KC | Dielectric Strength (Volts per mil) |
|---|---|---|---|
| (a) | 4.395 | .01734 | 467 |
| (b) | 3.237 | .02075 | 622 |
| (d) | — | — | 603 |
| (e) | 2.684 | .03425 | 162 |
| (f) | 2.693 | .02632 | 701 |

EXAMPLE 11 (COMPARATIVE EXAMPLE)

In order to bring out the surprising nature of the result obtained when aqueous silicates are mixed with urethane prepolymers in accordance with the present invention, the procedure of Example 1 was followed using the proportions of Example 1(b) but substituting water for the aqueous silicate of Example 1(b). More particularly, 25.5 parts by weight of the prepolymer of Example 1 having an NCO content of about 3.5% was mixed with 4.5 parts by weight of water and the mixture was placed in an open container. Upon standing, the mixture expanded and cured into a flexible foam having a volume three times that of the initial mixture. This contrasts with Example 1(b) where no foaming occurred and an elastomeric product containing substantially all of the water associated with the aqueous silicate was obtained.

As indicated above, it is possible by mixing the present aqueous dispersions with polyfunctional liquid urethane prepolymers to obtain products having certain of the properties of wood and which are suitable for use as light-weight, flame retardant structural materials. Examples 12 through 18 below illustrate the preparation of products of this type using trifunctional and tetrafunctional isocyanates.

EXAMPLE 12

A trifunctional prepolymer was prepared by reacting a trifunctional polypropylene glycol having an average molecular weight of about 4000 (Pluracol TP-4040) with tolylene diisocyanate to obtain a prepolymer having 2.7% NCO groups. A tetrafunctional prepolymer was prepared by reacting a tetrafunctional polypropylene glycol characterized by four secondary hydroxyl groups and having an average molecular weight of about 500 (Pluracol Tetrol 450) with tolylene diisocyanate to obtain a prepolymer having about 28% NCO groups.

A composition was prepared having the following formulation:

| Component | Parts by Weight |
|---|---|
| Tetrafunctional prepolymer | 12.6 |
| Trifunctional prepolymer | 5.4 |
| Aqueous sodium silicate (Silicate "N") | 12 |

The components were thoroughly mixed and allowed to stand at room temperature. It was found that the mixture cured and foamed moderately to produce a rigid, finely cellular product having a specific gravity of about 0.93. The foamed product developed in about 55 minutes and cured to a rigid state in about 6 hours. As in the preceding Examples, the water associated with the aqueous silicate remained bound within the composition. The product showed good flame retardant properties.

EXAMPLE 13

A composition was prepared having the following formulation:

| Component | Parts by Weight |
|---|---|
| Trifunctional prepolymer as in Ex. 12 | 11.25 |
| Tetrafunctional prepolymer as in Ex. 12 | 11.25 |
| Aqueous sodium silicate (Silicate "N") | 7.5 |

The components were thoroughly mixed and upon standing at room temperature yielded a hard, finely cellular product having properties similar to the properties of the product of Example 12.

EXAMPLE 14

A composition was prepared having the following formulation:

| Component | Parts by Weight |
|---|---|
| Trifunctional prepolymer as in Ex. 12 | 9 |
| Tetrafunctional prepolymer as in Ex. 12 | 9 |
| Aqueous sodium silicate (Silicate "N") | 12 |

The components were thoroughly mixed and allowed to stand at room temperature. The mixture foamed moderately to produce a rigid, finely cellular product having good flame retardant properties.

EXAMPLE 15

In this Example a mixture of polyfunctional urethane prepolymers and aqueous sodium silicate was prepared containing small amounts of stannous octoate and triethylene diamine as curing catalysts. The mixture had the following composition in parts by weight:

| Component | Parts by Weight |
|---|---|
| Trifunctional prepolymer as in Ex. 12 | 5.4 |
| Tetrafunctional prepolymer as in Ex. 12 | 12.6 |
| Aqueous sodium silicate (Silicate "N") | 12 |
| Stannous octoate | 0.044 |
| Triethylenediamine (DABCO WT) | 0.074 |

The prepolymers were mixed and the aqueous sodium silicate added to and mixed with the prepolymer mixture. Thereafter the stannous octoate and triethylene diamine were mixed with the polymer/silicate mixture.

The mixture foamed moderately for a period of about 7 minutes and a rigid, finely cellular product was obtained at the end of 12 minutes. The cellular product had a density of about 24 pounds per cubic foot.

EXAMPLE 16

A composition was prepared having the following formulation:

| Component | Parts by Weight |
|---|---|
| Trifunctional prepolymer as in Ex. 12 | 5.4 |
| Tetrafunctional prepolymer as in Ex. 12 | 12.6 |
| Aqueous sodium silicate (Silicate "N") | 12 |
| Triethylenediamine (DABCO WT) | 0.037 |

The foregoing components were mixed as in Example 15 and allowed to stand at room temperature. The mixture foamed moderately for a period of 15 minutes and reached a hard, finely cellular state in about 45 minutes. The density of the product was about 34 pounds per cubic foot.

EXAMPLE 17

A composition was prepared having the following formulation:

| Component | Parts by Weight |
|---|---|
| Trifunctional prepolymer as in Ex. 12 | 5.4 |
| Tetrafunctional prepolymer as in Ex. 12 | 12.6 |
| Aqueous sodium silicate (Silicate "N") | 12 |
| Stannous octoate | 0.022 |

The foregoing components were mixed as in Example 15 and allowed to stand at room temperature. The mixture foamed moderately for a period of about 35 minutes and reached a hard, finely cellular state in 1 hour. The density of the product was about 43 pounds per cubic foot.

EXAMPLE 18

A composition was prepared having the following formulation:

| Component | Parts by Weight |
|---|---|
| Trifunctional prepolymer as in Ex. 12 | 5.4 |
| Tetrafunctional prepolymer as in Ex. 12 | 12.6 |
| Aqueous sodium silicate (Silicate "N") | 12 |
| Triethylenediamine (DABCO WT) | 0.006 |
| Stannous octoate | 0.022 |

The foregoing components were mixed in the general manner described in Example 15, except that the triethylenediamine was premixed with the aqueous silicate before the silicate was mixed with the prepolymer mixture. The final mixture foamed moderately for a period of 5 minutes and reached a hard, finely cellular state in about 10 minutes. The density of the product was about 39 pounds per cubic foot.

EXAMPLE 19

A polyurethane prepolymer was prepared by reacting 424 grams of polypropylene glycol having a molecular weight of about 400 to 450 (NIAX PPG-425, Union Carbide Corporation) with 366 grams of toluene diisocyanate (HYLENE TM) to form an isocyanate-terminated prepolymer having two NCO groups per molecule. The isocyanate content of the prepolymer was 11.1%.

24 grams of this prepolymer was stirred for 1.5 minutes with a mixture of 16 grams of aqueous sodium silicate (Silicate N) and 0.4 grams of triethylene diamine as a catalyst. The mixture was then poured into a mold, wherein it formed a gel. After 7 to 10 minutes the mixture foamed in the mold to produce a semi-rigid, finely cellular, cured product.

EXAMPLE 20

The procedure of Example 19 was followed, except that a higher ratio of prepolymer to aqueous silicate was used and the catalyst was omitted. More particularly, 34 grams of the prepolymer of Example 19 was mixed with 6 grams of aqueous sodium silicate (Silicate N). The mixture foamed and cured to give a rigid cellular product.

EXAMPLE 21

In this Example a difunctional polyester-based urethane prepolymer was used which was the reaction product of toluene diisocyanate and a blend of the polyesters of Examples 1 and 19. The prepolymer (Solithane 670, Thiokol Chemical Corporation) had a molecular weight of about 1200.

34 grams of this prepolymer were mixed with 6 grams of aqueous sodium silicate (Silicate N) for 1.5 minutes, and poured into a mold. The mixture gelled, then foamed to produce a highly flexible cellular product.

EXAMPLE 22

36 grams of the tetrafunctional urethane prepolymer of Example 12 were mixed with 4 grams of aqueous sodium silicate (Silicate N), stirred for 1.5 minutes and poured into a mold. The mixture gelled, then foamed to produce a brittle, rigid foamed product.

EXAMPLE 23

18 grams of the trifunctional prepolymer of Example 12 were mixed with 12 grams of aqueous sodium silicate (Silicate N) for 4 minutes and poured into a rubber mold. The mixture cured on standing to a solid elastomer having good physical and mechanical properties. No exotherm or foaming was observed.

EXAMPLE 24

The procedure of Example 23 was followed, except that 34 grams of the prepolymer were mixed with 6 grams of the aqueous sodium silicate. Upon standing at ambient temperature for 16 hours the mixture cured to a tough, non-porous elastomer.

EXAMPLE 25

Six mixtures were prepared using three different difunctional urethane prepolymers. The prepolymers used were (a) the prepolymer of Example 1 (Solithane 291), (b) the prepolymer of Example 21 (Solithane 670) and (c) a polyester-based prepolymer which was the condensation product of the polyester of Example 1 and methylene bis-phenyl diisocyanate (Solithane 691, Thiokol Chemical Corporation). The prepolymers were mixed with an equal amount of dipropylene glycol dibenzoate (Benzoflex 9-88) and varying amounts of aqueous sodium silicate (Silicate N). The ingredients were stirred for 8.5 minutes and then poured into molds. On standing overnight all of the mixtures cured to solid non-porous products. The quantities of ingredients used are given in Table V below wherein the quantities are in grams.

Table V

| Experiment | 1 | 2 | 3 | 4 | 5 | 6 |
|---|---|---|---|---|---|---|
| Urethane prepolymer (Solithane 291) | 15 | — | — | — | — | — |

Table V-continued

| Experiment | 1 | 2 | 3 | 4 | 5 | 6 |
|---|---|---|---|---|---|---|
| Urethane prepolymer (Solithane 670) | — | 15 | — | — | — | — |
| Urethane prepolymer (Solithane 691) | — | — | 15 | 15 | 15 | 15 |
| Di-propylene glycol dibenzoate (Benzoflex 9-88) | 15 | 15 | 15 | 15 | 15 | 15 |
| Aqueous sodium silicate (Silicate "N") | 15 | 15 | 15 | 20 | 25 | 30 |

Samples 1 to 4 cured to form elastomers, Sample 5 cured to a hard product and Sample 6 cured to form a hard, brittle product.

It is, of course, to be understood that the foregoing Examples are intended to be illustrative only and that numerous changes can be made in the ingredients, proportions and conditions disclosed therein without departing from the spirit of the invention as defined in the appended claims. For example, various special purpose additives such as fillers, curing rate modifiers, adhesion promoters, plasticizers and the like previously known and used in the sealant art can be added to the above formulations as desired. Other modifications within the scope of the invention will be apparent to those skilled in the art.

I claim:

1. A composition comprising the reaction product of (a) a liquid isocyanate-terminated polyurethane prepolymer and (b) about 10% to 100% by weight, based on the weight of said prepolymer, of an aqueous colloidal dispersion selected from aqueous alkali metal silicates containing about 20% to 60% solids and having an $M_2O:SiO_2$ ratio of about 1:1 to 1:4 where M is an alkali metal, and aqueous magnesium oxide containing about 5% to 40% by weight solids.

2. A composition according to claim 1 wherein said aqueous silicate is a sodium silicate solution having an $Na_2O:SiO_2$ ratio of about 1:1 to 1:4.

3. A composition according to claim 1 wherein said liquid prepolymer is an isocyanate-terminated polyester.

4. A composition according to claim 1 wherein said liquid prepolymer is an isocyanate-terminated polyether.

5. A composition according to claim 1 wherein said liquid prepolymer is an isocyanate-terminated polybutadiene.

6. A composition according to claim 1 wherein said liquid prepolymer is an isocyanate-terminated polysulfide.

7. A composition according to claim 1 having incorporated therein about 10% to 50% by weight, based on the weight of said prepolymer, of a resinous extender selected from coal tar, mineral oil and poly-alpha-methylstyrene.

8. A rigid, fine-celled polyurethane foamed plastic comprising the reaction product of (a) at least one liquid polyurethane polymer having at least three free isocyanate groups per molecule and a molecular weight of 400 to 5000 and (b) 10% to 100% by weight, based on the weight of said prepolymer, of aqueous alkali metal silicate containing 20% to 60% by weight of solids and having an $M_2O:SiO_2$ ratio of 1:1 to 1:4 wherein M is an alkali metal.

9. A polyurethane foam according to claim 8 wherein the polyurethane-prepolymer is a mixture of prepolymers having three and four isocyanate groups per molecule.

10. A polyurethane foam according to claim 9 wherein the mixture of prepolymers contains from 25% to 75% by weight of prepolymer having three isocyanate groups and from 75% to 25% by weight of prepolymer having four isocyanate groups.

11. In a process for curing a liquid isocyanate-terminated polyurethane prepolymer with a curing agent to convert it into solid polyurethane, the improvement which comprises using as a curing agent from about 10% to 100% by weight, based on the weight of prepolymer, of an aqueous colloidal dispersion selected from aqueous alkali metal silicates containing 20% to 60% by weight solids and having an $M_2O:SiO_2$ ratio of about 1:1 to 1:4 with M representing an alkali metal, and aqueous magnesium oxide containing about 5% to 40% by weight solids.

12. A process for making a rigid, fine-celled polyurethane foamed plastic which comprises mixing at least one liquid polyurethane prepolymer having three free isocyanate groups, at least one liquid polyurethane prepolymer having four free isocyanate groups and reacting the resulting mixture with from 10% to 100% by weight, based on the weight of said mixture, of an aqueous alkali metal silicate containing 20% to 60% by weight of solids and having an $M_2O:SiO_2$ ratio of about 1:1 to 1:4 with M representing an alkali metal.

13. A process according to claim 12 wherein the reaction mixture contains from 10% to 50% by weight, based on the weight of polyurethane prepolymer, of a resinous extender selected from coal tar, mineral oil and alpha-methylstyrene.

14. A composition according to claim 1 wherein the colloidal dispersion is aqueous magnesium oxide containing 5% to 40% by weight of said oxide.

15. A process according to claim 11 wherein said colloidal dispersion is aqueous magnesium oxide containing 5% to 40% by weight of said oxide.

16. A composition comprising the reaction product of (a) a liquid isocyanate-terminated polyurethane prepolymer and (b) about 5% to 200% by weight, based on the weight of said prepolymer, of an aqueous colloidal dispersion selected from aqueous alkali metal silicates having an $M_2O:SiO_2$ ratio of up to about 1:1 where M is an alkali metal and containing about 20% to about 60% solids, and aqueous magnesium oxide containing about 5% to 40% by weight solids.

17. A composition according to claim 16 wherein said dispersion is a sodium silicate solution having an $Na_2O:SiO_2$ ratio of about 1:1 to 1:4.

18. In a process for curing a liquid isocyanate-terminated polyurethane prepolymer with a curing agent to convert it into solid polyurethane, the improvement which comprises using as a curing agent from 5% to 200% by weight, based on the weight of prepolymer, of an aqueous alkali metal silicate containing from 5% to 60% by weight of solids and having an $M_2O:SiO_2$ ratio of about 1:1 to 1:4.

19. A composition according to claim 16 having incorporated therein about 10% to 50% by weight, based on the weight of said prepolymer, of a resinous extender selected from coal tar, mineral oil and poly-alpha-methylstyrene.

20. A composition according to claim 16 having incorporated therein from 5% to 50%, based on the weight of prepolymer, of a high-boiling aromatic ester plasticizer.

21. A composition according to claim 19 wherein said plasticizer is a benzoate ester, a phthalate ester or a polyester benzoate.

22. A composition comprising the reaction product of (a) a liquid isocyanate-terminated polyurethane prepolymer and (b) about 5% to 200% by weight, based on the weight of said prepolymer, of an aqueous colloidal dispersion selected from aqueous alkali metal silicates having an $M_2O:SiO_2$ ratio of about 1:1 to 1:4 where M is an alkali metal and containing about 5% to about 60% solids, and aqueous magnesium oxide containing about 5% to 40% by weight solids.

23. In a process for curing a liquid isocyanate-terminated polyurethane prepolymer with a curing agent to convert it into solid polyurethane, the improvement which comprises using as a curing agent from about 5% to 200% by weight, based on the weight of prepolymer, of an aqueous colloidal dispersion selected from aqueous alkali metal silicates containing 20% to 60% by weight solids and having an $M_2O:SiO_2$ ratio of about 1:1 to 1:4 with M representing an alkali metal, and aqueous magnesium oxide containing about 5% to 40% by weight solids.

24. A composition comprising the reaction product of (a) a liquid isocyanate-terminated polyurethane prepolymer and (b) about 5% to 200% by weight, based on the weight of said prepolymer, of an aqueous alkali metal silicate containing from 5% to 60% by weight of solids and having an $M_2O:SiO_2$ ratio of about 1:1 to 1:4 where M is an alkali metal.

25. A composition according to claim 24 wherein said aqueous silicate is a potassium silicate solution having an $K_2O:SiO_2$ ratio of about 1:1 to 1:4.

* * * * *